Feb. 16, 1965 YOSHIO ANDO ET AL 3,170,058
METHOD OF REINFORCING GRAPHITE ARTICLES BY
DEPOSITING FUSED METALS
Filed April 26, 1962
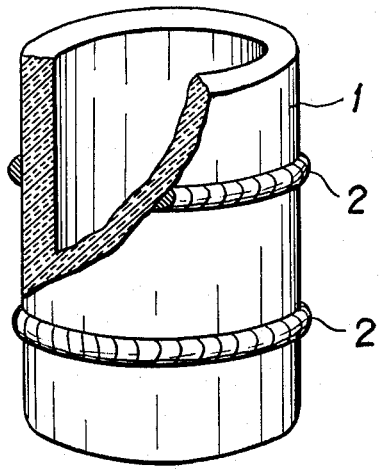
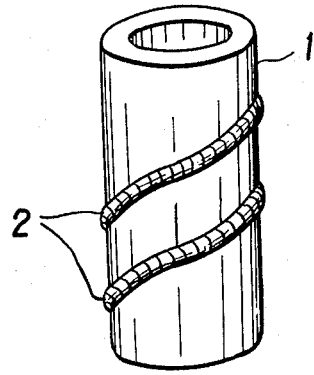
Yoshio Ando
Tadato Fujimura
INVENTORS

United States Patent Office 3,170,058
Patented Feb. 16, 1965

3,170,058
METHOD OF REINFORCING GRAPHITE ARTICLES
BY DEPOSITING FUSED METALS
Yoshio Ando, Tokyo, and Tadato Fujimura, Tokai-mura, Naka-gun, Japan, assignors to Japan Atomic Energy Research Institute, Tokyo, Japan, a corporation of Japan
Filed Apr. 26, 1962, Ser. No. 190,338
Claims priority, application Japan, June 16, 1961, 36/21,127
2 Claims. (Cl. 219—76)

The present invention relates to a method of reinforcing graphite articles by depositing fused metal or alloy on the surface along a line surrounding the graphite structure.

In reactors graphite is used abundantly as material for moderators and also as canning materials for fuels, but graphite has the disadvantage that it is brittle so that a large sized structure such as graphite tubes passing fluid therethrough is liable to be broken. Accordingly, when a large graphite article is shaped or machined it is necessary for it to be reinforced by some means.

The object of the invention is to obviate the above disadvantage of graphite and to provide a method of reinforcing the graphite article by simple and effective means.

The present invention is characterized in that a graphite structure is reinforced by depositing fused metal, more particularly metallic alloy on the outer surface of the graphite article in order to prevent the breakdown caused by various stresses actually imposed on a particularly large sized graphite article. It should be noted that the word "Metal" here includes metallic alloys.

In carrying out the method of the invention, the reinforcing metal is fused by electric arc and deposited on the outer surface of a graphite structure in bold relief to rigidly adhere to the graphite body and to tightly clamp the graphite article from the outside of it by the shrinkage stress caused when the fused metal cools, thereby creating compressive stresses in the graphite structure itself and when a tensile stress acts in the interior of the graphite structure it can be compensated with the compressive stress caused by the reinforcing metal attached around the periphery of the graphite structure so that the structure is prevented from breaking down, that is the strength and stability of the graphite structure can be augmented by the fused metal deposited and tightly adhered to the surface.

According to the method of the invention, for depositing metal on the outer surface of a graphite structure a wire or powders of the metallic alloy consisting of 5 to 50%, preferably 10 to 36% of nickel, less than 2% of carbon and the balance substantially of iron is attached or filled on the outer surface of the shaped article made of graphite and heated by an electric arc to a temperature of 1,200 to 1,600° C. in an atmosphere of inert gas or reducing gas such as argon, helium, carbon dioxide, or nitrogen gas to melt and deposit the fused metal, thereby forming a reinforcing member around the graphite article. Alternatively the above alloy can be deposited on the graphite surface by means of a welding torch.

For a better understanding of the invention reference is taken to the accompanying drawings, in which FIG. 1 is a perspective view illustrating a manner of reinforcing a cylindrical graphite structure by adhering fused alloy according to the invention, and FIG. 2 is a perspective view similar to FIG. 1 when the fused alloy is adhered to the structure in a spiral form.

Referring to the accompanying drawings, 1 represents a graphite structure such as cylinder, and 2 represents reinforcing alloy deposited by arc welding on the graphite surface according to the invention.

Example

On the outer periphery of a solid drawn graphite tube is deposited iron-nickel alloy (Ni 30 to 50%, Fe 70 to 50%) and it was subjected to the hydraulic test by applying pressure from inside, and ascertained that it can safely resist against the hydraulic pressure more than three times that which has no fused metal deposition.

The method of the invention can be applied to the reinforcement of any kinds of graphite articles and their examples are mentioned as follows:

(1) When graphite is used for jet nozzles if the outer periphery of the nozzle is reinforced by the method of the invention it can resist very high thermal stresses.

(2) When the method of the invention is applied to the reinforcement of graphite tubes of a large length the pipe can stand the use even when the inner pressure of fluid flowing through the graphite pipe exceeds the safe allowable stress of graphite.

What we claim is:

1. A method of reinforcing graphite articles, more particularly graphite tubes, by depositing fused metallic alloy which comprises depositing iron-nickel alloy containing 5 to 50% of nickel and the balance substantially of iron in bold relief on the surface spirally around said graphite tube by means of an electric arc to firmly amalgamate the fused and deposited iron alloy with the surface of said graphite tube.

2. A method according to claim 1 wherein an alloy containing 30 to 50% of Ni, less than 0.2% of C and the balance substantially of iron is used as the depositing material.

References Cited by the Examiner
UNITED STATES PATENTS

| 1,790,213 | 1/31 | Gwaltney | 117—93 |
| 1,924,876 | 8/33 | Morgan | 117—93 |
| 2,427,350 | 9/47 | Carpenter | 219—76 |

FOREIGN PATENTS 588,369  11/33  Germany.

RICHARD M. WOOD, *Primary Examiner.*